Aug. 29, 1944.          E. T. CARLSON          2,357,171
              BUS BAR CONNECTING CLAMP
                 Filed April 13, 1943
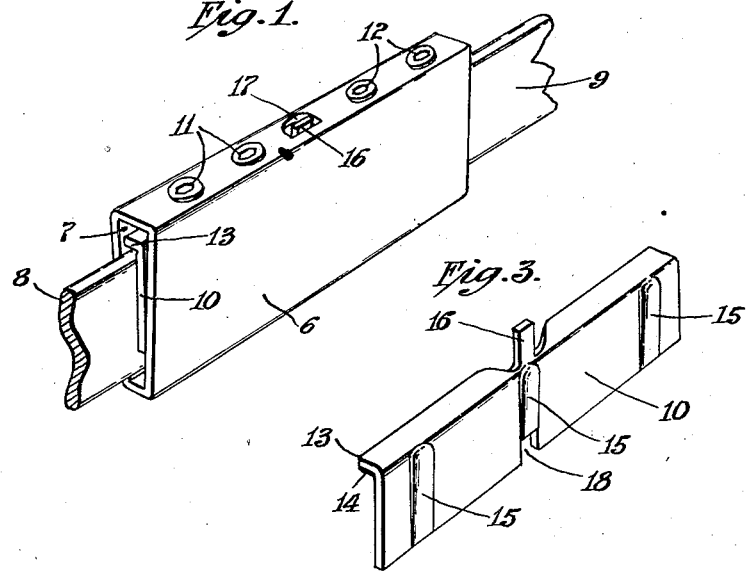
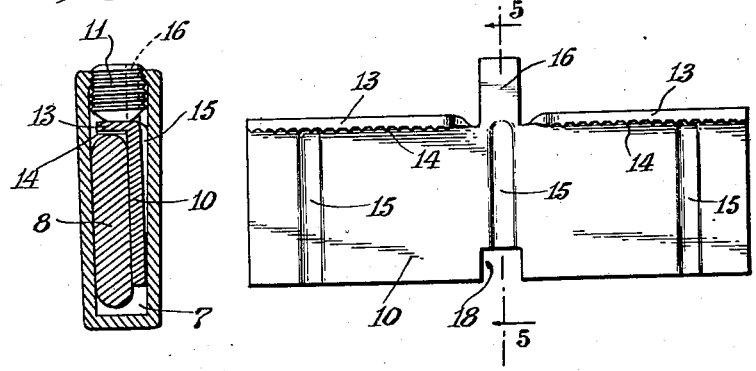
INVENTOR
Elmer T. Carlson Patented Aug. 29, 1944

2,357,171

UNITED STATES PATENT OFFICE 2,357,171

BUS BAR CONNECTING CLAMP

Elmer T. Carlson, Wyoming, Ohio, assignor to The Trumbull Electric Manufacturing Company, Plainville, Conn., a corporation of Connecticut Application April 13, 1943, Serial No. 482,859

4 Claims. (Cl. 287—65)

My invention relates to devices for connecting the ends of bus bars and especially flat bars which it is desirable to connect end to end.

The main object is to provide a simple, compact but effective device.

Another object is to provide not only a good electrical connection but one having a maximum strength and rigidity for a given amount of metal.

For this purpose I provide a one piece tubular body having a longitudinal passage for receiving the ends of the bus bars. This passage is somewhat wider at one edge, which for convenience we shall call the top, than it is at the opposite edge or bottom. It is enough wider than the thickness of the bus bars so as to accommodate alongside of the bus bars a clamping plate or wedge and enough deeper than the width of the bars to allow for adjustment of the clamping plate. This clamping plate or wedge extends the length of the connector and has a flange which overlies the upper edges of the bus bar sections and a number of clamp screws are seated in the top edge of the connector body for engaging this flange and forcing the clamping plate down between the bus bars and one wall of the passage.

Fig. 1 is a perspective view showing the preferred form of the invention as used.

Fig. 2 is a transverse sectional view of the same parts.

Fig. 3 is a perspective view of the clamping plate.

Fig. 4 is a face view of the clamping plate.

Fig. 5 is a transverse sectional view of the plate on the line 5—5 of Fig. 4.

The sleeve or tubular body 6 has a longitudinal passage 7 which is narrower at the bottom than at the top, that is, "tapered," and enough larger than the bus bar ends 8 and 9 to accommodate them. The clamping plate 10 is preferably of sheet metal and adapted to be forced downwardly in the passage alongside of the bus bar ends by means of set screws 11, 11, 12, 12. The upper edge of the clamp plate has a flange 13 which overlies the bus bar ends and therefore tends to force them into line when the screws are set up tight against them. The underside of this flange may be knurled or toothed at 14 to more securely hold the bus bars against longitudinal movement in the connector. The plate also preferably has tapered ribs 15, 15 for coacting with the inner wall of the passage 7 when the plate is forced down between the wall and the bus bars. The plate has a stop lug 16 at its upper edge adapted to fit into the hole or recess 17 in the upper edge of the body 6 so as to prevent the plate when inserted into the passage 7 from moving longitudinally in the passage. The plates when stamped or cut from sheet metal may have the lug of one plate cut from the recess 18 of the next plate for economy of manufacture.

I claim:

1. A connecting sleeve having a tapered passage to receive two bus bars, a single clamp plate slidable edgewise in said passage alongside said bars and having flanges to overlie the bus bars and clamp screws for engaging said flanges and forcing said plate edgewise toward the narrower edge of said passage to clamp the bars therein.

2. A rigid connecting sleeve having a flat passage to receive bus bars, a single clamp plate slidable edgewise in said passage and having tapered projecting ribs on one face and clamp screws in opposite ends of said sleeve for forcing said plate edgewise in said passage to clamp the bars therein and means for limiting longitudinal movement of said plate in said passage.

3. A connecting sleeve having a tapered passage to receive bus bars, a single clamp plate slidable edgewise in said passage and clamp screws engaging opposite ends of said plate for forcing said plate edgewise toward the narrower edge of said passage to clamp the bars therein and a lug on the plate extending into one edge of the sleeve for limiting longitudinal movement of said plate in said passage.

4. A rigid connecting sleeve having a flat passage with an opening in one edge, a single clamp plate in the passage having flanges to engage the edges of two bars in the passage and having a lug extending into said opening and clamp screws in the edge of the sleeve for engaging opposite ends of said flanges.

ELMER T. CARLSON.